(12) United States Patent
Harda et al.

(10) Patent No.: US 9,764,665 B2
(45) Date of Patent: Sep. 19, 2017

(54) APPARATUS AND METHOD FOR VEHICLE OCCUPANT PROTECTION IN LARGE ANIMAL COLLISIONS

(71) Applicant: VOLVO CAR CORPORATION, Gothenburg (SE)

(72) Inventors: Peter Harda, Torslanda (SE); Anders Axelson, II, Torslanda (SE); Par Nilsson, Molndal (SE); Stefan Berge, Vastra Frolunda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/564,591

(22) Filed: Dec. 9, 2014

(65) Prior Publication Data
US 2015/0165937 A1    Jun. 18, 2015

(30) Foreign Application Priority Data

Dec. 16, 2013  (EP) .................................... 13197410

(51) Int. Cl.
*B60T 7/22*       (2006.01)
*B60R 21/0132*    (2006.01)
(Continued)

(52) U.S. Cl.
CPC ......... *B60N 2/4221* (2013.01); *B60N 2/0232* (2013.01); *B60N 2/2884* (2013.01);
(Continued)

(58) Field of Classification Search
CPC ... B60R 21/0134; B60R 21/013; B60R 21/01; B60R 2021/01013; B60R 2021/0004;
(Continued)

(56) References Cited

U.S. PATENT DOCUMENTS 5,810,417 A * 9/1998 Jesadanont ................. 296/68.1
6,463,372 B1 * 10/2002 Yokota et al. ................. 701/45
(Continued)

FOREIGN PATENT DOCUMENTS

DE   102011108918 A1   1/2013
EP       2261089 B1 *  3/2013  ......... B60R 21/0132
EP       2653360 A1   10/2013

OTHER PUBLICATIONS

Extended European Search Report Dated Jun. 6, 2014, Application No. 13197410.7-1758, Applicant Volvo Car Corporation, 8 Pages.

*Primary Examiner* — Thomas G Black
*Assistant Examiner* — Demetra Smith-Stewart
(74) *Attorney, Agent, or Firm* — Brooks Kushman P.C.

(57) ABSTRACT

An apparatus and method are disclosed for vehicle occupant protection in large animal collisions. Objects forward of the host vehicle are monitored using at least one forward looking remote sensor and object signals output. A velocity of the host vehicle is determined and velocity signals output. The object signals and the velocity signals are processed to determine whether the host vehicle unavoidably will suffer a collision with a large animal while traveling at or above a threshold velocity and a collision signal is output. Operation of a motor operated height adjustment device, an inclination adjustment device and/or a longitudinal position adjustment device of a vehicle seat is triggered to move a seat cushion and a backrest thereof away from a leading edge of a roof of the host vehicle in response to the collision signal.

19 Claims, 6 Drawing Sheets

(51) Int. Cl.
  *B60R 21/0134*    (2006.01)
  *B60N 2/42*       (2006.01)
  *B60N 2/28*       (2006.01)
  *B60N 2/02*       (2006.01)
  *B60R 21/01*          (2006.01)
  *B60R 21/0136*        (2006.01)
  *B60R 21/00*          (2006.01)

(52) U.S. Cl.
  CPC ............ *B60N 2/42* (2013.01); *B60R 21/01* (2013.01); *B60R 21/0134* (2013.01); *B60R 21/0136* (2013.01); *B60R 2021/003* (2013.01); *B60R 2021/01252* (2013.01); *B60R 2021/01327* (2013.01); *B60T 7/22* (2013.01)

(58) Field of Classification Search
  CPC ............ B60R 300/301; B60R 16/037; B60R 2021/01304; B60R 21/01554; B60R 19/40; B60R 2019/007; B60R 2022/4666; B60N 2/0276; B60N 2/42; B60W 30/08; B60W 2420/52; B60W 2420/54; B60Q 1/525; G01S 11/14; G01S 13/865; G01S 17/023; B60G 2500/30; G05D 1/0246; G06K 9/00805
  See application file for complete search history.

(56) References Cited

U.S. PATENT DOCUMENTS

| | | | |
|---|---|---|---|
| 7,000,944 B2 * | 2/2006 | Bakhsh | B60R 21/213 280/730.1 |
| 7,303,041 B2 * | 12/2007 | Stuve | B60R 21/0136 180/274 |
| 7,997,375 B2 * | 8/2011 | Shaw | B60R 21/38 180/274 |
| 2006/0186702 A1 * | 8/2006 | Kisanuki | B60R 21/36 296/187.04 |
| 2006/0232052 A1 * | 10/2006 | Breed | B60R 21/013 280/735 |
| 2007/0228784 A1 * | 10/2007 | Wells, Jr. | 297/216.14 |
| 2008/0040004 A1 | 2/2008 | Breed | |
| 2008/0243342 A1 * | 10/2008 | Breed | B60R 21/0132 701/45 |
| 2009/0072596 A1 | 3/2009 | Rogers | |
| 2009/0299576 A1 * | 12/2009 | Baumann et al. | 701/45 |
| 2010/0280718 A1 | 11/2010 | Hashimoto et al. | |
| 2011/0068608 A1 * | 3/2011 | Ohtsubo et al. | 296/193.07 |
| 2012/0098244 A1 * | 4/2012 | Browne | B60R 21/13 280/801.1 |
| 2012/0242530 A1 * | 9/2012 | Luebbert et al. | 342/70 |
| 2015/0191204 A1 * | 7/2015 | Neufeldt | B62D 25/145 296/193.06 |

* cited by examiner

APPARATUS AND METHOD FOR VEHICLE OCCUPANT PROTECTION IN LARGE ANIMAL COLLISIONS

CROSS-REFERENCE TO RELATED APPLICATIONS

This application claims foreign priority benefits under 35 U.S.C. §119(a)-(d) to European patent application number EP 13197410.7, filed Dec. 16, 2013, which is incorporated by reference in its entirety.

TECHNICAL FIELD

Embodiments herein relate to an apparatus and method for vehicle occupant protection in large animal collisions as well as an automotive vehicle that comprises such an apparatus.

BACKGROUND

In some motorized countries there exist the risks of encountering quite large animals, such as e.g., moose, elks, large deer and other animals of similar size, when driving along in a motor vehicle. There is of course a risk of serious consequences should a collision occur between one's own vehicle and a large animal. Collisions with such large animals often occur at significant speeds, as the animals often move quite rapidly onto the road from the cover of surrounding vegetation.

When a vehicle impacts a large animal at high speed there is a significant risk of severe injuries due to deformation of the forward parts of the vehicle roof. The vehicle roof will usually be folded downwards and pushed towards the heads of the front seat occupants if impacted by a large heavy animal when travelling at high speed. As a consequence thereof the heads of the front seat occupants will be at risk of being trapped between the intruding vehicle roof and headrests of the respective front seats of the vehicle.

A number of active safety systems for avoiding or mitigating collisions have been introduced lately. One type of system, with a potentially large positive impact on accident statistics, is a Forward Collision Avoidance System (FCAS). An FCAS uses sensors based on technologies such as RADAR (RAdio Detection And Ranging), LIDAR (LIght Detection And Ranging), LASER (Light Amplification by Stimulated Emission of Radiation) and cameras to monitor the region in front of the host vehicle. In the FCAS a tracking algorithm is used to estimate the state of the objects ahead and a decision algorithm uses the estimated states to determine any action, such as e.g., warning a driver or performing autonomous braking of the vehicle.

Automotive manufacturers are today studying collision avoidance systems providing warning and auto-braking functionality for an imminent collision with an animal. Such warning and auto-braking functionality is normally based on the use of sensors, such as those mentioned above, in order to detect the position and motion of animals. A threat assessor then estimates if the collision avoidance system equipped vehicle and the animal is on a collision course by predicting the positions a short time in the future, usually one to three seconds.

Typically, the decisions to perform warning and auto-braking are based on predictions of the paths of the host vehicle and the animal. The position and motion of the animal is, as mentioned above, determined using one or more sensors, such as camera sensors, radar sensors or laser equipment sensors, or combinations thereof.

In case predicted future paths of a host vehicle and the animal intersect within such a short time that the driver will have to act instantly in order to avoid a collision, a warning is issued. In case the predicted future paths intersect within such a short time that avoidance of a collision by either steering or braking actions performed by a driver is unlikely, auto-braking may be applied in order to avoid or mitigate the consequences of the collision.

Although the above systems provide great benefits for vehicle occupant protection in large animal collisions there is still room for improvement.

SUMMARY

Embodiments herein aim to provide an improved apparatus for vehicle occupant protection in large animal collisions, especially with respect to the risk of injuries to vehicle occupants due to deformation of the forward parts of the vehicle roof in a collision with a large animal.

This is provided through an apparatus, comprising: at least one forward looking remote sensor arranged to monitor a road ahead of a vehicle hosting the apparatus for potential collision threats and detect objects forward of the host vehicle and output object signals representative thereof; at least one velocity sensor arranged to determine a velocity of the host vehicle and output velocity signals representative thereof; a processing device arranged to process at least the object signals and the velocity signals to determine whether the host vehicle unavoidably will suffer a collision with a large animal while travelling at or above a threshold velocity at which such a collision could cause partial intrusion into a passenger compartment of a leading edge of a roof of the vehicle and to output a collision signal in response thereto; at least one vehicle seat with a seat cushion mounted on a seat frame, the height of which is adjustable through a motor operated height adjustment device, and a backrest, the inclination of which is adjustable through a motor operated inclination adjustment device and a longitudinal position of the vehicle seat being adjustable through a motor operated longitudinal position adjustment device; a triggering device arranged to trigger operation of at least one of the motor operated height adjustment device, the motor operated inclination adjustment device and the motor operated longitudinal position adjustment device to move at least one of the seat cushion and the backrest away from the leading edge of the roof of the host vehicle in response to the collision signal indicating that the host vehicle is about to suffer a large animal collision.

The provision of enabling the vehicle seat adjustment devices to move at least one of the seat cushion and the backrest away from the leading edge of the roof of the host vehicle in response to the collision signal indicating that the host vehicle is about to suffer a large animal collision provides for improved clearance between the heads of vehicle occupants and a potentially intruding vehicle roof as a result of a subsequent collision with a large animal.

According to a second aspect the triggering device is arranged to trigger operation of the motor operated inclination adjustment device of the at least one vehicle seat to move the backrest thereof away from the leading edge of the roof of the host vehicle in response to the collision signal indicating that the host vehicle is about to suffer a large animal collision.

The provision of enabling the vehicle seat adjustment devices to move the backrest away from the leading edge of the roof of the host vehicle provide the most efficient way of improving clearance in vehicle seat systems where only one adjustment motor of each vehicle seat can be operated at one time.

According to a third aspect the triggering device is arranged to trigger operation of the motor operated height adjustment device of the at least one vehicle seat to move the seat cushion away from the leading edge of the roof of the host vehicle in response to the collision signal indicating that the host vehicle is about to suffer a large animal collision.

The provision of enabling the vehicle seat adjustment devices to move the seat cushion away from the leading edge of the roof of the host vehicle provide an alternative for improving clearance in vehicle seat systems where only one adjustment motor of each vehicle seat can be operated at one time.

According to a fourth aspect the triggering device is arranged to sequentially trigger operation of firstly the motor operated inclination adjustment device to first move the backrest away from the leading edge of the roof of the host vehicle and thereafter the motor operated height adjustment device to move the seat cushion away from the leading edge of the roof of the host vehicle in response to the collision signal indicating that the host vehicle is about to suffer a large animal collision.

The provision of enabling the vehicle seat adjustment devices to operate sequentially, to first move the backrest and thereafter the seat cushion, provide an improvement for vehicle seat systems where only one adjustment motor can be operated at one time.

According to a fifth aspect the triggering device is arranged to sequentially trigger operation of firstly the motor operated height adjustment device to first move the seat cushion away from the leading edge of the roof of the host vehicle and thereafter the motor operated inclination adjustment device to move the backrest away from the leading edge of the roof of the host vehicle in response to the collision signal indicating that the host vehicle is about to suffer a large animal collision.

The provision of enabling the vehicle seat adjustment devices to operate sequentially, to first move the seat cushion and thereafter the backrest, provide an alternative improvement for vehicle seat systems where only one adjustment motor can be operated at one time.

According to a sixth aspect the triggering device is arranged to simultaneously trigger operation of the motor operated inclination adjustment device to move the backrest away from the leading edge of the roof of the host vehicle and the motor operated height adjustment device to move the seat cushion away from the leading edge of the roof of the host vehicle in response to the collision signal indicating that the host vehicle is about to suffer a large animal collision.

The provision of simultaneously triggered operation provides for the most rapid improvement of clearance between the heads of the vehicle occupants and a potentially intruding vehicle roof as reclining of the backrests of the vehicle seats and lowering of the seat cushions are performed simultaneously.

According to a seventh aspect the threshold velocity has been previously determined and set through at least one of crash-tests, simulations, calculations or statistics relevant for large animal collisions involving vehicles of the same type as the host vehicle.

The provision of basing the threshold velocity on vehicle specific data provides an efficient way of ensuring that the apparatus only triggers operation of vehicle seat adjustment motors in cases where a real risk of vehicle roof intrusion into the passenger compartment of the vehicle exist.

According to an eight aspect the threshold velocity has been previously set within the range of 80 to 90 km/h.

The provision of setting the threshold velocity within this range provides an improvement also for vehicles where there is insufficient crash data for setting a more model specific threshold.

According to a ninth aspect the processing device further is arranged to process at least the object signals and the velocity signals to calculate a time to impact and that the triggering device is arranged to trigger operation of at least one of the motor operated height adjustment device and the motor operated inclination adjustment device when the calculated time to impact falls below one second.

The provision of triggering operation of the vehicle seat adjustment motors when the calculated time to impact falls below one second ensures that such movement of the vehicle seats occurs first as a collision is imminent eliminating unnecessary adjustment of the vehicle seats.

According to a tenth aspect the at least one forward looking remote sensor arranged to monitor the road ahead of the host vehicle comprises at least one of a RADAR technology sensor, a LIDAR technology sensor, a vision technology sensor, an ultrasound technology sensor, an infrared technology sensor or fusions of sensors based on one or more of these sensing technologies.

The provision of basing the forward looking remote sensor on sensors or fusions of sensors based on one or more of these sensing technologies, as described for the tenth aspect, provides for high confidence sensor data for judgment whether the vehicle is about to suffer a large animal collision.

According to an eleventh aspect the at least one forward looking remote sensor arranged to monitor the road ahead of the host vehicle is a camera based vision sensor.

The provision of a camera based vision sensor provides for a low cost implementation of the apparatus for vehicle occupant protection in large animal collisions.

According to a twelfth aspect the triggering device further is arranged to trigger operation of the motor operated longitudinal position adjustment device to move the vehicle seat away from the leading edge of the roof of the host vehicle in response to the collision signal indicating that the host vehicle is about to suffer a large animal collision.

The provision of moving the vehicle seat, and thus the backrest thereof, longitudinally backwards in the vehicle away from the leading edge of the roof will provide an even further improved clearance between the head of a vehicle front seat occupant and a leading edge of a potentially intruding roof.

According to a thirteenth aspect the triggering device further is arranged to trigger operation of at least one of a braking system of the host vehicle to perform autonomous braking of the host vehicle and a reversible restraint system of the host vehicle to perform tensioning of seat belts of the host vehicle in response to a collision signal indicating that the host vehicle is about to suffer a large animal collision.

The provision of combining vehicle seat adjustment with autonomous braking provide for further improved clearance between the heads of the vehicle occupants and a potentially intruding vehicle roof as a reduction in vehicle velocity provided by the autonomous braking will result in less intrusion by an impacted vehicle roof, and performing tensioning of seat belts of the host vehicle in response to a collision signal indicating that the host vehicle is about to suffer a large animal collision helps ensure correct pre-impact positioning of a vehicle occupant should the vehicle suffer a large animal collision.

Further embodiments herein aim to provide a method for vehicle occupant protection in large animal collisions in a vehicle that comprises at least one vehicle seat with a seat cushion mounted on a seat frame the height of which is adjustable through a motor operated height adjustment device, a backrest the inclination of which is adjustable through a motor operated inclination adjustment device and a longitudinal position of the vehicle seat being adjustable through a motor operated longitudinal position adjustment device.

This is provided through a method comprising the steps of: monitoring, using at least one forward looking remote sensor, a road ahead of a vehicle hosting the apparatus for potential collision threats and detecting objects forward of the host vehicle and outputting object signals representative thereof; determining a velocity of the host vehicle, using at least one velocity sensor, and outputting velocity signals representative thereof; processing, using a processing device, at least the object signals and the velocity signals to determine whether the host vehicle unavoidably will suffer a collision with a large animal while travelling at or above a threshold velocity at which such a collision could cause partial intrusion into a passenger compartment of a leading edge of a roof of the vehicle, and outputting a collision signal in response thereto; triggering, using a triggering device, operation of at least one of the motor operated height adjustment device, the motor operated inclination adjustment device and the motor operated longitudinal position adjustment device to move at least one of the seat cushion and the backrest away from the leading edge of the roof of the host vehicle in response to the collision signal indicating that the host vehicle is about to suffer a large animal collision.

The provision of moving at least one of the seat cushion and the backrest away from the leading edge of the roof of the host vehicle in response to the collision signal indicating that the host vehicle is about to suffer a large animal collision provides for improved clearance between the heads of vehicle occupants and a potentially intruding vehicle roof as a result of a subsequent collision with a large animal.

According to a final aspect is provided an automotive vehicle which comprises an apparatus for vehicle occupant protection in large animal collisions as above.

An automotive vehicle which comprises an apparatus for vehicle occupant protection in large animal collisions as above provides for improved safety for vehicle occupants in large animal collisions.

BRIEF DESCRIPTION OF THE DRAWINGS

In the following, embodiments herein will be described in greater detail by way of example only with reference to the below drawings.

Figure 1:
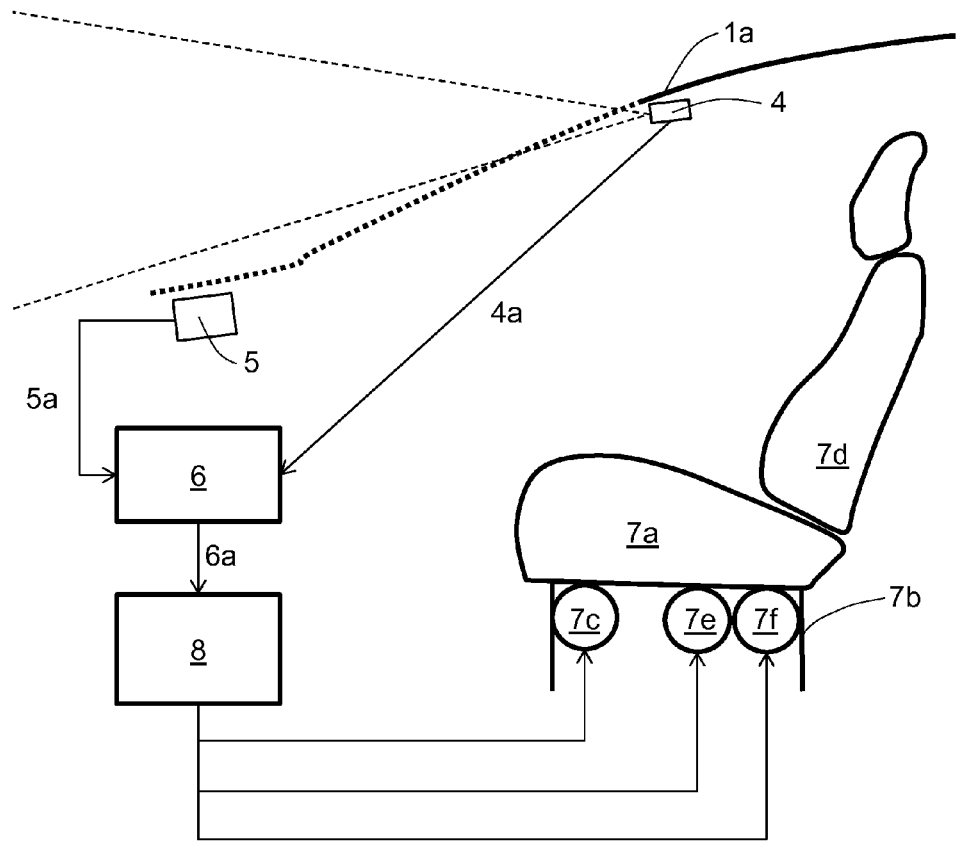
FIG. 1 is a schematic illustration of an apparatus for vehicle occupant protection in large animal collisions according to embodiments herein.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The Figures are not necessarily to scale. Some features may be exaggerated or minimized to show details of particular components. Therefore, specific structural and functional details disclosed herein are not to be interpreted as limiting, but merely as a representative basis for teaching one skilled in the art.

In overview, embodiments herein, utilizes conventional motor operated height adjustment devices, motor operated inclination adjustment devices and motor operated longitudinal position adjustment devices of vehicle 1 front seats 7 in order to provide for improved vehicle occupant 2 protection should a vehicle 1 suffer a large animal 3 collision.

Motor operated height adjustment devices, motor operated inclination adjustment devices and motor operated longitudinal position adjustment devices of vehicle 1 seats 7 as used herein incorporates electro-motor operated, pneumatic-motor operated and hydraulic-motor operated height adjustment and inclination adjustment devices of vehicle 1 seats 7.

Large animals 3, in respect of the embodiments herein, relate to animals such as elk, moose or large deer and similar, i.e., animals of substantial weight and of such height that the bulk of their body weight normally will be situated above bonnet height of a vehicle 1 colliding with them.

One point of impact during large animal 3 collisions, at least for a vehicle 1 having a standard height bonnet, is the leading edge of the roof 1a of the vehicle 1. This localization of the point of impact at the leading edge of the roof 1a of the vehicle 1 when colliding with a large animal 3 will, if the vehicle 1 travels at high speed, often cause deformation of the forward parts of the vehicle roof 1*a*.

Should such deformation occur there is a significant risk of severe injuries as the vehicle roof 1*a* will usually be folded downwards and pushed towards the heads of the front seat 7 occupants 2, potentially trapping the heads of the front seat 7 occupants 2 between the intruding vehicle roof 1*a* and headrests of the respective front seats 7 of the vehicle 1.

Thus, in order to provide for improved vehicle occupant 2 protection, should a vehicle 1 suffer such a large animal 3 collision, according to embodiments herein is provided an apparatus for vehicle occupant 2 protection in large animal 3 collisions as illustrated schematically in FIG. 1.

The apparatus comprises at least one forward looking remote sensor 4 arranged to monitor a road ahead of a vehicle 1 hosting the apparatus for potential collision threats and detect objects, such as large animals 3, forward of the host vehicle 1 and output object signals 4*a* representative thereof.

Further, at least one velocity sensor 5 is arranged to determine a velocity of the host vehicle 1 and to output velocity signals 5*a* representative thereof.

A processing device 6 is arranged to process at least the object signals 4*a* and the velocity signals 5*a* to determine whether the host vehicle 1 unavoidably will suffer a collision with a large animal 3 while travelling at or above a threshold velocity at which such a collision could cause partial intrusion into a passenger compartment of a leading edge of a roof 1*a* of the vehicle 1 and to output a collision signal 6*a* in response thereto. The processing device 6 suitably comprises a processing unit, such as a computer processor, and appropriate software for controlling operation thereof.

There is at least one vehicle seat 7 with a seat cushion 7*a* mounted on a seat frame 7*b*, the height of which is adjustable through a motor operated height adjustment device 7*c*, and a backrest 7*d*, the inclination of which is adjustable through a motor operated inclination adjustment device 7*e*, and a longitudinal position of the vehicle seat 7 being adjustable through a motor operated longitudinal position adjustment device 7*f*.

A triggering device 8, which may be a thyristor device, electronic circuit, or any other known triggering device, is arranged to trigger operation of at least one of the motor operated height adjustment device 7*c*, the motor operated inclination adjustment device 7*e* and the motor operated longitudinal position adjustment device 7*f* to move at least one of the seat cushion 7*a* and the backrest 7*d* away from the leading edge of the roof 1*a* of the host vehicle 1 in response to the collision signal 6*a* indicating that the host vehicle 1 is about to suffer a large animal 3 collision. In this way is provided for improved clearance between the heads of vehicle 1 front seat 7 occupants 2 and a potentially intruding vehicle roof 1*a*.

Figure 2:
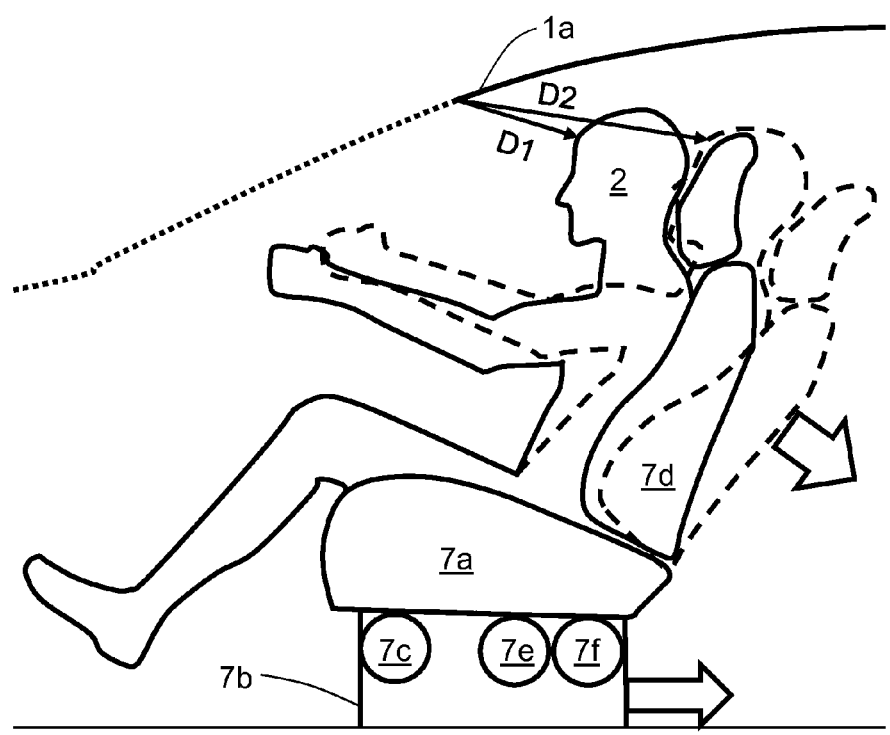
FIG. 2 is a schematic illustration of how a clearance between a head of a vehicle occupant and a potentially intruding vehicle roof is improved through reclining a backrest of a vehicle seat.

In some embodiments hereof, as illustrated schematically in FIG. 2, the triggering device 8 is arranged to trigger operation of the motor operated inclination adjustment device 7*e* of the at least one vehicle seat 7 to move the backrest 7*d* thereof away from the leading edge of the roof 1*a* of the host vehicle 1 in response to the collision signal 6*a* indicating that the host vehicle 1 is about to suffer a large animal 3 collision. In FIG. 2 full lines illustrate pre-adjustment positions of the vehicle occupant 2 and the backrest 7*d* of the vehicle seat 7 and dashed lines post-adjustment positions thereof. This embodiment will, through reclining the backrests 7*d* of the vehicle seats 7, probably provide the most efficient way of improving clearance in vehicle seat 7 systems where only one adjustment motor of each vehicle seat 7 can be operated at one time, e.g., due to restriction in a control system or wiring of the vehicle seats 7. As illustrated in FIG. 2 clearance between the head of a vehicle 1 front seat 7 occupant 2 and a potentially intruding roof 1*a* will be increased from D1 to D2 simply by reclining the backrest 7*d* of the vehicle seat 7.

Figure 3:
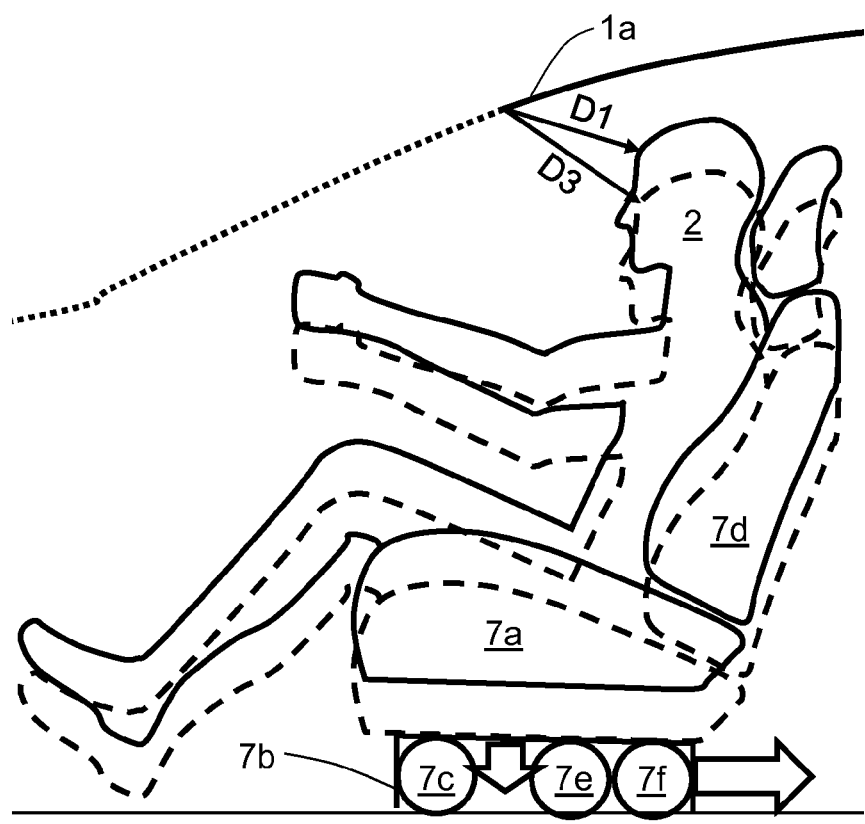
FIG. 3 is a schematic illustration of how a clearance between a head of a vehicle occupant and a potentially intruding vehicle roof is improved through lowering the seat cushion of a vehicle seat.

In other embodiments hereof, as illustrated in FIG. 3, the triggering device 8 is arranged to trigger operation of the motor operated height adjustment device 7*c* of the at least one vehicle seat 7 to move the seat cushion 7*a* away from the leading edge of the roof 1*a* of the host vehicle 1 in response to the collision signal 6*a* indicating that the host vehicle 1 is about to suffer a large animal 3 collision. In FIG. 3 full lines illustrate pre-adjustment positions of the vehicle occupant 2 and the seat cushion 7*a* of the vehicle seat 7 and dashed lines post-adjustment positions thereof. This embodiment will, through lowering the seat cushions 7*a*, provide an alternative for providing improved clearance in vehicle seat 7 systems where only one adjustment motor of each vehicle seat 7 can be operated at one time, e.g., due to restriction in a control system or wiring of the vehicle seats 7. As illustrated in FIG. 3 clearance between the head of a vehicle 1 front seat 7 occupant 2 and a potentially intruding roof 1*a* will be increased from D1 to D3 simply by lowering the seat cushion 7*a* of the vehicle seat 7.

Figure 4:
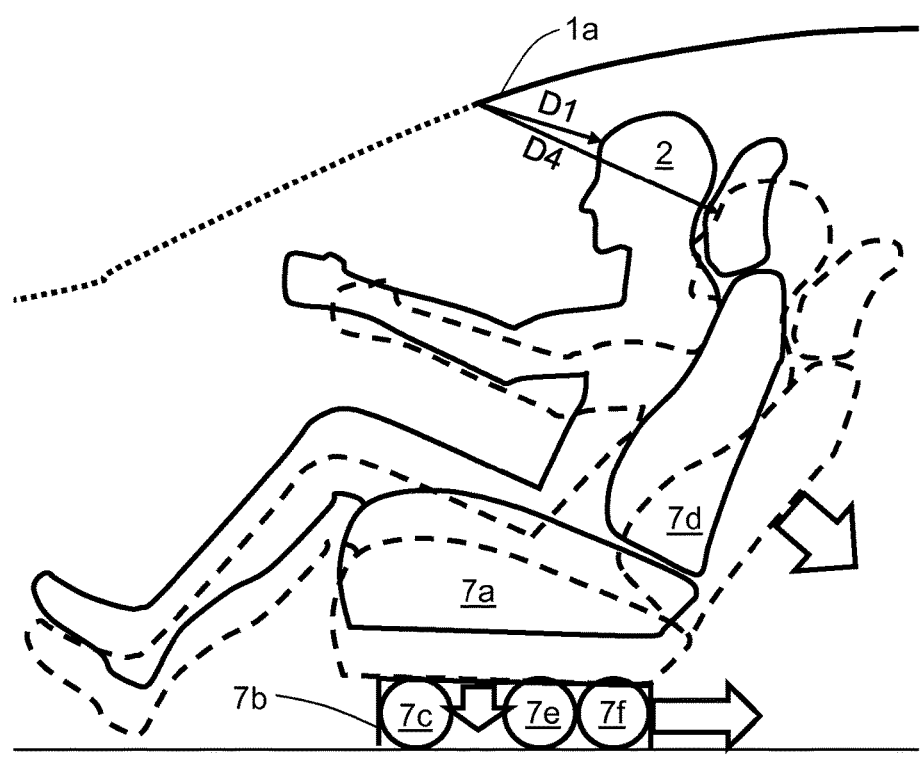
FIG. 4 is a schematic illustration of how a clearance between a head of a vehicle occupant and a potentially intruding vehicle roof is improved through lowering the seat cushion and reclining a backrest of a vehicle seat.

As an improvement to the embodiments above for vehicle seat 7 systems where only one adjustment motor can be operated at one time, the triggering device 8 is arranged to sequentially trigger operation of firstly the motor operated inclination adjustment device 7*e* to first move the backrest 7*d* away from the leading edge of the roof 1*a* of the host vehicle 1, as illustrated in FIG. 2, and thereafter the motor operated height adjustment device 7*c* to move the seat cushion 7*a* away from the leading edge of the roof 1*a* of the host vehicle 1, as illustrated in FIG. 3, in response to the collision signal 6*a* indicating that the host vehicle 1 is about to suffer a large animal 3 collision. Through lowering the seat cushions 7*a* after reclining the backrests 7*d* of the vehicle seats 7 clearance between the heads of the vehicle 1 occupants 2 and a potentially intruding roof 1*a* is further improved. As illustrated in FIG. 4 clearance between the head of a vehicle 1 front seat 7 occupant 2 and a potentially intruding roof 1*a* will be increased from D1 to D4 by reclining the backrest 7*d* of the vehicle seat 7 and thereafter lowering the seat cushion 7*a* of the vehicle seat 7. Also in FIG. 4 full lines illustrate pre-adjustment positions of the vehicle occupant 2 and the backrest 7*d* as well as the seat cushion 7*a* of the vehicle seat 7 and dashed lines post-adjustment positions thereof.

As an alternative to the other embodiment above for vehicle seat 7 systems where only one adjustment motor can be operated at one time, the triggering device 8 is arranged to sequentially trigger operation of firstly the motor operated height adjustment device 7*c* to first move the seat cushion 7*a* away from the leading edge of the roof 1*a* of the host vehicle 1, as illustrated in FIG. 3, and thereafter the motor operated inclination adjustment device 7*e* to move the backrest 7*d* away from the leading edge of the roof 1*a* of the host vehicle 1, as illustrated in FIG. 2, in response to the collision signal 6*a* indicating that the host vehicle 1 is about to suffer a large animal 3 collision. Through reclining the backrests 7*d* of the vehicle seats 7 following lowering of the seat cushions 7*a* clearance between the heads of the vehicle 1 occupants 2 and a potentially intruding vehicle roof 1*a* is further improved. As illustrated in FIG. 4 clearance between the head of a vehicle 1 front seat 7 occupant 2 and a potentially intruding roof 1a will be increased from D1 to D4 by lowering the seat cushion 7a of the vehicle seat 7 and thereafter reclining the backrest 7d of the vehicle seat 7.

For embodiments where two or more adjustment motors of each vehicle seat 7 can be operated at one time the triggering device 8 is arranged to simultaneously trigger operation of the motor operated inclination adjustment device 7e to move the backrest 7d away from the leading edge of the roof 1a of the host vehicle 1, as illustrated in FIG. 2, and the motor operated height adjustment device 7c to move the seat cushion 7a away from the leading edge of the roof 1a of the host vehicle 1, as illustrated in FIG. 3, in response to the collision signal 6a indicating that the host vehicle 1 is about to suffer a large animal 3 collision. This embodiment provides for the most rapid improvement of clearance between the heads of the vehicle 1 occupants 2 and a potentially intruding vehicle roof 1a, as reclining of the backrests 7d of the vehicle seats 7 and lowering of the seat cushions 7a is performed simultaneously. As illustrated in FIG. 4 clearance between the head of a vehicle 1 front seat 7 occupant 2 and a potentially intruding roof 1a will here also be increased from D1 to D4 by lowering the seat cushion 7a of the vehicle seat 7 and simultaneously reclining the backrest 7d of the vehicle seat 7.

In embodiments hereof the threshold velocity, at which a collision with a large animal 3 could cause partial intrusion into a passenger compartment of a leading edge of a roof 1a of the vehicle 1, has been previously determined and set through at least one of crash-tests, simulations, calculations or statistics relevant for large animal 3 collisions involving vehicles of the same type as the host vehicle 1. In this way it is possible to selectively only perform operation of one or more of the adjustment motors of the vehicle seats 7 if there is a real risk of threatening intruding deformation of the roof 1a of the vehicle 1.

If no previously determined threshold velocity is available for the current vehicle 1 type, it is suggested for the threshold velocity to be previously set within the range of 80 to 90 km/h. This, as it will be known to persons skilled in the art of large animal 3 collisions that deformation of the vehicle roofs will occur for most of today's passenger cars if impacted by a large animal 3 at or above these velocities. Thus, this embodiment makes the arrangement useful and provides an improvement also for vehicles 1 where there is insufficient crash data for setting a more model specific threshold.

In some embodiments hereof the processing device 6 is further arranged to process at least the object signals 4a and the velocity signals 5a to calculate a time to impact and the triggering device 8 arranged to trigger operation of at least one of the motor operated height adjustment device 7c and the motor operated inclination adjustment device 7e when the calculated time to impact falls below one second. In this way it is possible to avoid triggering movement of the vehicle seat 7 before a collision is imminent, thus e.g., being as non-intrusive as possible for a vehicle 1 driver during the probably quite stressful pre-crash moments.

According to embodiments hereof the at least one forward looking remote sensor 4 arranged to monitor the road ahead of the host vehicle 1, e.g., for acquiring information regarding objects external to the vehicle 1 possibly indicating that an impact to a large animal 3 is imminent, comprises at least one of a RADAR (RAdio Detection And Ranging) technology sensor, a LIDAR (Light Detection And Ranging) technology sensor, a vision technology sensor (cameras), an ultrasound technology sensor, an infrared technology sensor or fusions of sensors based on one or more of these sensing technologies.

Examples of such fusion sensors are integrated Radar and Camera (RACam) System sensors. RACam Systems combines radar sensing, vision sensing and performs data fusion of the information acquired by such sensors for obtaining highly reliable decision support. Thus, information from fused sensors may be utilized to improve the confidence of the decision to trigger operation of at least one of the motor operated height adjustment device 7c and the motor operated inclination adjustment device 7e of the vehicle seats 7.

As a minimum it is envisaged that the at least one forward looking remote sensor 4 arranged to monitor the road ahead of the host vehicle 1 is a camera based vision sensor. In accordance with such an embodiment is provided for a low cost implementation of the apparatus for vehicle occupant 2 protection in large animal 3 collisions.

In such embodiments the camera based vision sensor can comprise at least one of a Charge-Coupled Device (CCD) camera and a Complementary Metal-Oxide Semiconductor (CMOS) camera. Such cameras are technically proven and readily available, even as fairly low cost components.

Figure 5:
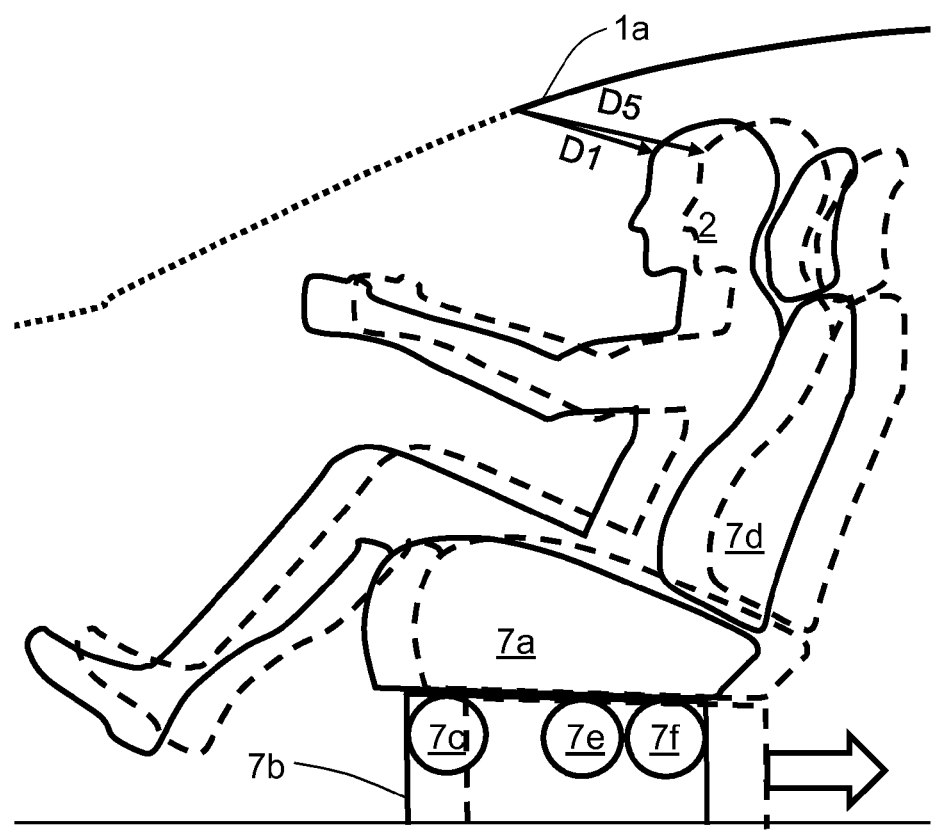
FIG. 5 is a schematic illustration of how a clearance between a head of a vehicle occupant and a potentially intruding vehicle roof is improved through moving the vehicle seat, and thus the backrest thereof, longitudinally backwards in the vehicle.

As an improvement to all embodiments herein it is possible that also, as illustrated in FIG. 5, the triggering device 8 further is arranged to trigger operation of the motor operated longitudinal position adjustment device 7f to move the vehicle seat 7, and thus the backrest 7d thereof, longitudinally backwards in the vehicle 1, away from the leading edge of the roof 1a of the host vehicle 1, in response to the collision signal 6a indicating that the host vehicle 1 is about to suffer a large animal 3 collision. As illustrated in FIG. 5, where full lines illustrate pre-adjustment positions of the vehicle occupant 2 and the vehicle seat 7 and dashed lines post-adjustment positions thereof, clearance between the head of a vehicle 1 front seat 7 occupant 2 and a leading edge of a potentially intruding roof 1a will be increased from D1 to D5 through moving the vehicle seat 7 longitudinally backwards in the vehicle 1, away from the leading edge of the roof 1a, in response to the collision signal 6a indicating that the host vehicle 1 is about to suffer a large animal 3 collision. Combined with any one of the embodiments described herein this will provide an even further improved clearance between the head of a vehicle 1 front seat 7 occupant 2 and a leading edge of a potentially intruding roof 1a.

In yet further embodiments hereof it is advantageous if the triggering device 8 further is arranged to trigger operation of a braking system of the host vehicle 1 to perform at least one of a braking system of the host vehicle 1 to perform autonomous braking of the host vehicle 1 and a reversible restraint system of the host vehicle 1 to perform tensioning of seat belts of the host vehicle 1 in response to a collision signal 6a indicating that the host vehicle 1 is about to suffer a large animal 3 collision. Through combining autonomous braking with the operation of at least one of the motor operated height adjustment device 7c and the motor operated inclination adjustment device 7e of the vehicle seats 7 the clearance between the heads of vehicle 1 occupants 2 and a potentially intruding vehicle roof 1a is further improved. This as the reduction in vehicle 1 velocity provided through autonomous braking will reduce the impact velocity and thus the impact forces and thereby the intrusion of the vehicle roof 1a. Performing tensioning of seat belts of the host vehicle 1 in response to a collision signal 6a indicating that the host vehicle 1 is about to suffer a large animal 3 collision helps ensure correct pre-impact positioning of a vehicle occupant 2 should the vehicle 1 suffer a large animal 3 collision.

It is further envisaged that the decision to trigger vehicle seat 7 position adjustment may also be influenced by information from further vehicle 1 sensors (not shown), such as inertia sensors located in a Restraints Control Module (RCM) or provided at separate locations throughout the vehicle 1, e.g., sensors for detecting combinations of accelerations and/or pitch of the vehicle 1. Examples of such sensors are accelerometers and gyros.

Figure 6:
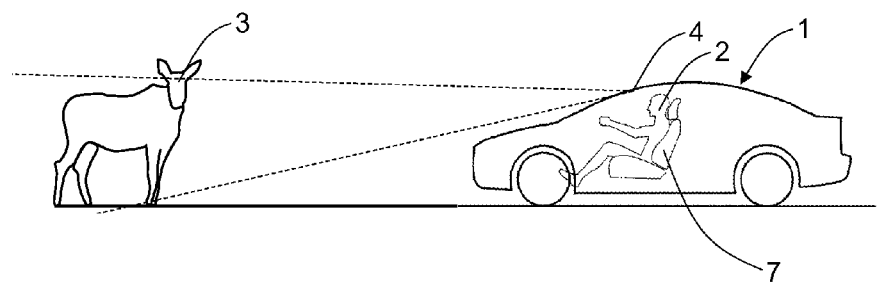
FIG. 6 is a schematic illustration of vehicle comprising an apparatus for vehicle occupant protection in large animal collisions encountering a large animal on a road.

In FIG. 6 is provided a schematic illustration of vehicle 1 comprising an apparatus for vehicle occupant 2 protection in large animal 3 collisions encountering a large animal 3 on a road. The large animal 3 is detected by the forward looking remote sensor 4. If the vehicle 1 is travelling at or above a threshold velocity at which an unavoidable collision with the detected large animal 3 could cause partial intrusion into a passenger compartment of a leading edge of a roof 1a of the vehicle 1, operation of one or more vehicle seat 7 adjustment devices is triggered, as illustrated in FIGS. 6 and 7.

Figure 7:
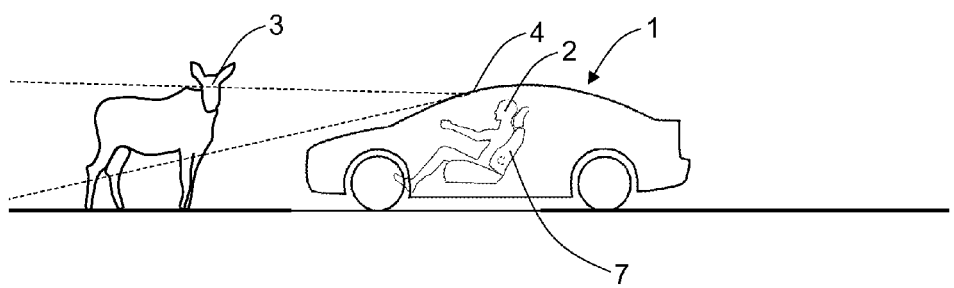
FIG. 7 is a schematic illustration of how a clearance between a head of a vehicle occupant and a potentially intruding vehicle roof is improved through reclining a backrest of a vehicle seat of the vehicle according to FIG. 6.

In FIG. 7 is illustrated how, in certain embodiments herein, the clearance between the head of the vehicle occupant 2 and the potentially intruding vehicle roof 1a is improved through reclining the backrest 7d of the vehicle seat 7 of the vehicle 1 according to FIG. 6.

Figure 8:
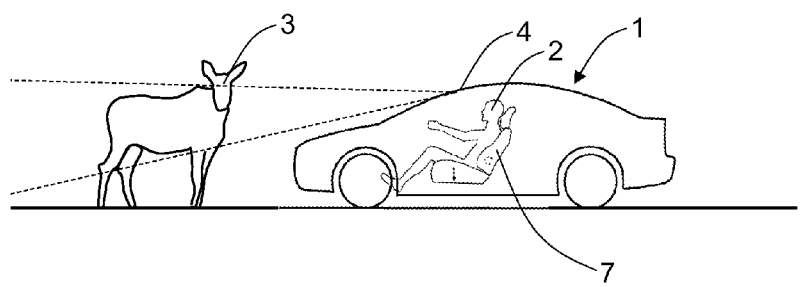
FIG. 8 is a schematic illustration of how a clearance between a head of a vehicle occupant and a potentially intruding vehicle roof is improved through lowering the seat cushion and reclining a backrest of a vehicle seat of the vehicle according to FIG. 6.

In FIG. 8 is illustrated how, in other alternative embodiments herein, the clearance between the head of the vehicle occupant 2 and the potentially intruding vehicle roof 1a is improved through both lowering the seat cushion 7a and reclining the backrest 7d of the vehicle seat 7 of the vehicle 1 according to FIG. 6.

According to the present application is also envisaged a method for vehicle occupant 2 protection in large animal 3 collisions in a vehicle 1 that comprises at least one vehicle seat 7 with a seat cushion 7a mounted on a seat frame 7b the height of which is adjustable through a motor operated height adjustment device 7c, a backrest 7d the inclination of which is adjustable through a motor operated inclination adjustment device 7e and a longitudinal position of the vehicle seat 7 being adjustable through a motor operated longitudinal position adjustment device 7f, which comprises the following steps:—monitoring, using at least one forward looking remote sensor 4, a road ahead of a vehicle 1 hosting the apparatus for potential collision threats and detecting objects forward of the host vehicle 1 and outputting object signals 4a representative thereof;

determining a velocity of the host vehicle 1, using at least one velocity sensor 5, and outputting velocity signals 5a representative thereof;

processing, using a processing device 6, at least the object signals 4a and the velocity signals 5a to determine whether the host vehicle 1 unavoidably will suffer a collision with a large animal 3 while travelling at or above a threshold velocity at which such a collision could cause partial intrusion into a passenger compartment of a leading edge of a roof 1a of the vehicle 1, and outputting a collision signal 6a in response thereto;

triggering, using a triggering device 8, operation of at least one of the motor operated height adjustment device 7c, the motor operated inclination adjustment device 7e and the motor operated longitudinal position adjustment device 7f to move at least one of the seat cushion 7a and the backrest 7d away from the leading edge of the roof 1a of the host vehicle 1 in response to the collision signal 6a indicating that the host vehicle 1 is about to suffer a large animal 3 collision.

According to one embodiment of the method operation of the motor operated inclination adjustment device 7e of the at least one vehicle seat 7 is triggered to move the backrest 7d thereof away from the leading edge of the roof 1a of the host vehicle 1 in response to the collision signal 6a indicating that the host vehicle 1 is about to suffer a large animal 3 collision.

This embodiment will, through reclining the backrests 7d of the vehicle seats 7, probably provide the most efficient way of improving clearance in vehicle seat 7 systems where only one adjustment motor of each vehicle seat 7 can be operated at one time, e.g., due to restriction in a control system or wiring of the vehicle seats 7.

In other embodiment only the seat cushions 7a are moved away from the leading edge of the roof 1a of the host vehicle 1. Alternatively first the backrests 7d and thereafter the seat cushions 7a are sequentially moved away from the leading edge of the roof 1a of the host vehicle 1, or vice versa. In yet another alternative embodiment the backrests 7d and the seat cushions 7a are moved away from the leading edge of the roof 1a of the host vehicle 1 simultaneously. Selection of which embodiment of the method to apply should be based on the particulars of the specific vehicle 1 and the control system or wiring of the vehicle seats 7 thereof.

In yet further embodiments the method comprises the additional step of determining the threshold velocity through at least one of crash-tests, simulations, calculations or statistics relevant for large animal 3 collisions involving vehicles of the same type as the host vehicle 1 or alternatively, if no data for such determination is available, setting the threshold velocity within the range of 80 to 90 km/h.

In still further embodiments method comprises the additional steps of processing at least the object signals 4a and the velocity signals 5a to calculate a time to impact and triggering operation of at least one of the motor operated height adjustment device 7c and the motor operated inclination adjustment device 7e when the calculated time to impact falls below one second, thus avoiding triggering movement of the vehicle seat 7 before a collision is imminent.

In a yet further embodiment the method comprises the additional step of triggering operation of at least one of a braking system of the host vehicle 1 to perform autonomous braking of the host vehicle 1 and a reversible restraint system of the host vehicle 1 to perform tensioning of seat belts of the host vehicle 1 in response to a collision signal 6a indicating that the host vehicle 1 is about to suffer a large animal 3 collision, thus reducing vehicle 1 velocity and thereby reducing the impact velocity and thus the impact forces and the consequent threatening intrusion of the vehicle roof 1a as well as ensuring correct pre-impact positioning of a vehicle occupant 2 should the vehicle 1 suffer a large animal 3 collision.

In accordance with the present application is also envisaged an automotive vehicle 1 comprising an apparatus for vehicle occupant 2 protection in large animal 3 collisions as described in the foregoing.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the appended claims. Additionally, the features of various implementing embodiments may be combined to form further embodiments.

What is claimed is:

1. An apparatus for vehicle occupant protection in large animal collisions, comprising:
at least one forward looking remote sensor arranged to monitor a road ahead of a vehicle hosting the apparatus for potential collision threats, detect objects forward of the host vehicle and output object signals representative thereof, the object signals indicating whether a detected object has a weight and height such that the detected object represents a large animal having a bulk of its body weight situated above a bonnet height of the host vehicle;
at least one velocity sensor arranged to determine a velocity of the host vehicle and output velocity signals representative thereof;
a processing device arranged to process at least the object signals and the velocity signals to determine whether the host vehicle unavoidably will suffer a collision with a large animal of sufficient weight and height such that a bulk of its body weight will be situated above a bonnet height of the host vehicle, while traveling at or above a threshold velocity at which such a collision could cause partial intrusion into a passenger compartment of a leading edge of a roof of the vehicle, where the threshold velocity has been previously determined and set through at least one of crash-tests, simulation, calculations and statistics relevant for large animal collisions involving vehicle of the same type as the host vehicle, and to output a collision signal in response thereto;
a vehicle seat with a seat cushion mounted on a seat frame, the height of which is adjustable through a motor operated height adjustment device, and a backrest, the inclination of which is adjustable through a motor operated inclination adjustment device, wherein a longitudinal position of the vehicle seat is adjustable through a motor operated longitudinal position adjustment device; and
a triggering device arranged to trigger operation of at least one of the motor operated height adjustment device, the motor operated inclination adjustment device and the motor operated longitudinal position adjustment device to move at least one of the seat cushion and the backrest away from the leading edge of the roof of the host vehicle in response to the collision signal indicating that the host vehicle is about to suffer a large animal collision.

2. The apparatus of claim 1 wherein the triggering device is arranged to trigger operation of the motor operated inclination adjustment device of the at least one vehicle seat to move the backrest thereof away from the leading edge of the roof of the host vehicle in response to the collision signal indicating that the host vehicle is about to suffer a large animal collision.

3. The apparatus of claim 2 wherein the triggering device further is arranged to trigger operation of the motor operated longitudinal position adjustment device to move the vehicle seat away from the leading edge of the roof of the host vehicle in response to the collision signal indicating that the host vehicle is about to suffer a large animal collision.

4. The apparatus of claim 1 wherein the triggering device is arranged to trigger operation of the motor operated height adjustment device of the at least one vehicle seat to move the seat cushion away from the leading edge of the roof of the host vehicle in response to the collision signal indicating that the host vehicle is about to suffer a large animal collision.

5. The apparatus of claim 1 wherein the triggering device is arranged to sequentially trigger operation of firstly the motor operated inclination adjustment device to first move the backrest away from the leading edge of the roof of the host vehicle and thereafter the motor operated height adjustment device to move the seat cushion away from the leading edge of the roof of the host vehicle in response to the collision signal indicating that the host vehicle is about to suffer a large animal collision.

6. The apparatus of claim 1 wherein the triggering device is arranged to sequentially trigger operation of firstly the motor operated height adjustment device to first move the seat cushion away from the leading edge of the roof of the host vehicle and thereafter the motor operated inclination adjustment device to move the backrest away from the leading edge of the roof of the host vehicle in response to the collision signal indicating that the host vehicle is about to suffer a large animal collision.

7. The apparatus of claim 1 wherein the triggering device is arranged to simultaneously trigger operation of the motor operated inclination adjustment device to move the backrest away from the leading edge of the roof of the host vehicle and the motor operated height adjustment device to move the seat cushion away from the leading edge of the roof of the host vehicle in response to the collision signal indicating that the host vehicle is about to suffer a large animal collision.

8. The apparatus of claim 1 wherein the threshold velocity has been previously set within the range of 80 to 90 km/h.

9. The apparatus of claim 1 wherein the processing device further is arranged to process at least the object signals and the velocity signals to calculate a time to impact and that the triggering device is arranged to trigger operation of at least one of the motor operated height adjustment device and the motor operated inclination adjustment device when the calculated time to impact falls below one second.

10. The apparatus of claim 1 wherein the at least one forward looking remote sensor arranged to monitor the road ahead of the host vehicle comprises at least one of a RADAR technology sensor, a LIDAR technology sensor, a vision technology sensor, an ultrasound technology sensor, an infrared technology sensor or fusions of sensors based on one or more of these sensing technologies.

11. The apparatus of claim 10 wherein the at least one forward looking remote sensor arranged to monitor the road ahead of the host vehicle is a camera based vision sensor.

12. The apparatus of claim 1 wherein the triggering device further is arranged to trigger operation of at least one of a braking system of the host vehicle to perform autonomous braking of the host vehicle and a reversible restraint system of the host vehicle to perform tensioning of seat belts of the host vehicle in response to a collision signal indicating that the host vehicle is about to suffer a large animal collision.

13. A method for vehicle occupant protection in large animal collisions in a vehicle comprising a vehicle seat with a seat cushion mounted on a seat frame the height of which is adjustable through a motor operated height adjustment device, and a backrest the inclination of which is adjustable through a motor operated inclination adjustment device, wherein a longitudinal position of the vehicle seat is adjustable through a motor operated longitudinal position adjustment device, the method comprising:
  monitoring, using at least one forward looking remote sensor, a road ahead of the vehicle for potential collision threats, detecting objects forward of the vehicle and outputting object signals representative thereof, the object signals indicating whether a detected object has a weight and height such that the detected object represents a large animal having a bulk of its body weight situated above a bonnet height of the host vehicle;
  determining a velocity of the vehicle, using at least one velocity sensor, and outputting velocity signals representative thereof;
  processing, using a processing device, at least the object signals and the velocity signals to determine whether the vehicle unavoidably will suffer a collision with a large animal of sufficient weight and height such that a bulk of its body weight will be situated above a bonnet height of the host vehicle, while traveling at or above a threshold velocity at which such a collision could cause partial intrusion into a passenger compartment of a leading edge of a roof of the vehicle, where the threshold velocity has been previously determined and set through at least one of crash-tests, simulation, calculations and statistics relevant for large animal collisions involving vehicle of the same type as the host vehicle, and outputting a collision signal in response thereto; and
  triggering, using a triggering device, operation of at least one of the motor operated height adjustment device, the motor operated inclination adjustment device and the motor operated longitudinal position adjustment device to move at least one of the seat cushion and the backrest away from the leading edge of the roof of the host vehicle in response to the collision signal indicating that the host vehicle is about to suffer a large animal collision.

14. An automotive vehicle comprising an apparatus for vehicle occupant protection in large animal collisions according to claim 1.

15. An apparatus for vehicle occupant protection in large animal collisions, the apparatus for use in a vehicle comprising a vehicle seat with a seat cushion mounted on a seat frame, the height of which is adjustable through a motor operated height adjustment device, and a backrest, the inclination of which is adjustable through a motor operated inclination adjustment device, wherein a longitudinal position of the vehicle seat is adjustable through a motor operated longitudinal position adjustment device, the vehicle further comprising at least one forward looking remote sensor arranged to monitor a road ahead of the vehicle for potential collision threats, detect objects forward of the vehicle and output object signals representative thereof, the object signals indicating whether a detected object has a weight and height such that the detected object represents a large animal having a bulk of its body weight situated above a bonnet height of the host vehicle, and at least one velocity sensor arranged to determine a velocity of the vehicle and output velocity signals representative thereof, the apparatus comprising:
  a processing device arranged to process at least the object signals and the velocity signals to determine whether the host vehicle unavoidably will suffer a collision with a large animal of sufficient weight and height such that a bulk of its body weight will be situated above a bonnet height of the host vehicle, while traveling at or above a threshold velocity at which such a collision could cause partial intrusion into a passenger compartment of a leading edge of a roof of the vehicle, where the threshold velocity has been previously determined and set through at least one of crash-tests, simulation, calculations and statistics relevant for large animal collisions involving vehicle of the same type as the host vehicle, and to output a collision signal in response thereto; and
  a triggering device arranged to trigger operation of at least one of the motor operated height adjustment device, the motor operated inclination adjustment device and the motor operated longitudinal position adjustment device to move at least one of the seat cushion and the backrest away from the leading edge of the roof of the host vehicle in response to the collision signal indicating that the host vehicle is about to suffer a large animal collision.

16. The apparatus of claim 15 wherein the triggering device is arranged to trigger operation of the motor operated inclination adjustment device of the at least one vehicle seat to move the backrest thereof away from the leading edge of the roof of the host vehicle in response to the collision signal indicating that the host vehicle is about to suffer a large animal collision.

17. The apparatus of claim 15 wherein the triggering device is arranged to trigger operation of the motor operated height adjustment device of the at least one vehicle seat to move the seat cushion away from the leading edge of the roof of the host vehicle in response to the collision signal indicating that the host vehicle is about to suffer a large animal collision.

18. The apparatus of claim 15 wherein the triggering device is arranged to sequentially trigger operation of firstly the motor operated inclination adjustment device to first move the backrest away from the leading edge of the roof of the host vehicle and thereafter the motor operated height adjustment device to move the seat cushion away from the leading edge of the roof of the host vehicle in response to the collision signal indicating that the host vehicle is about to suffer a large animal collision.

19. The apparatus of claim 15 wherein the triggering device is arranged to sequentially trigger operation of firstly the motor operated height adjustment device to first move the seat cushion away from the leading edge of the roof of the host vehicle and thereafter the motor operated inclination adjustment device to move the backrest away from the leading edge of the roof of the host vehicle in response to the collision signal indicating that the host vehicle is about to suffer a large animal collision.

* * * * *